United States Patent

Ven et al.

(12) United States Patent
(10) Patent No.: US 6,349,718 B1
(45) Date of Patent: Feb. 26, 2002

(54) DEVICE FOR HEATING WITH SOLAR ENERGY

(75) Inventors: Livien Domien Ven, Antwerp; Michel Sureda, Borgerhout, both of (BE)

(73) Assignee: Suria Holdings, societe a responsabilite limitee (LU)

( * ) Notice: Subject to any disclaimer, the term of this patent is extended or adjusted under 35 U.S.C. 154(b) by 0 days.

(21) Appl. No.: 09/600,893

(22) PCT Filed: Feb. 9, 1999

(86) PCT No.: PCT/BE99/00017

§ 371 Date: Aug. 17, 2000

§ 102(e) Date: Aug. 17, 2000

(87) PCT Pub. No.: WO99/42765

PCT Pub. Date: Aug. 26, 1999

(30) Foreign Application Priority Data

Feb. 19, 1998 (NL) .............................................. 1008356

(51) Int. Cl.⁷ .................................................. F24J 2/18
(52) U.S. Cl. ........................ 126/685; 126/600; 126/607; 126/686; 126/692; 126/906; 359/872
(58) Field of Search ................................ 126/685, 684, 126/687, 688, 692, 696, 600, 602, 605, 607, 680, 681, 682, 648, 649, 650, 651, 652, 653, 654, 655, 573, 906, 686; 359/872, 873

(56) References Cited

U.S. PATENT DOCUMENTS 3,861,379 A * 1/1975 Anderson, Jr. .............. 126/692
4,159,710 A * 7/1979 Prast ........................... 126/692
4,229,076 A * 10/1980 Chromie ...................... 359/853
4,730,602 A * 3/1988 Posansky et al. ............ 126/692
5,374,317 A * 12/1994 Lamb et al. .................. 126/692
5,899,199 A * 5/1999 Mills ........................... 126/692

FOREIGN PATENT DOCUMENTS

| EP | 0 076 455 A2 | * | 4/1983 |
| FR | 1 520 370 | * | 11/1963 |
| WO | WO-96/30705 A1 | * | 10/1996 |

* cited by examiner

*Primary Examiner*—James C. Yeung
*Assistant Examiner*—Josiah C. Cocks
(74) *Attorney, Agent, or Firm*—Bacon & Thomas, PLLC

(57) ABSTRACT

Device for heating with solar energy, which device contains at least one mirror construction (1) which is mounted on a frame (3) in a movable manner and which be directed towards the sun, and at least one collector (4) extending parallel to the mirror construction (1) in order to collect the solar radiation reflected by the mirror construction (1), characterized in that the mirror construction (1) contains a number of almost flat mirror strips (2) extending next to one another in the longitudinal direction of the collector (4) and which are each provided on the frame (3) such that they can rotate around their longitudinal direction, whereas the collector (4) is stationary in relation to the frame (3), whereby the mirror strips (2) are situated in an almost horizontal plane with their axes of rotation, whereby the device contains means (16) to rotate the mirror strips (2) and the mirroring surface of the mirror strips (2) such that the solar rays coming in on said surface can be reflected towards the collector (4).

16 Claims, 7 Drawing Sheets

DEVICE FOR HEATING WITH SOLAR ENERGY

The present invention concerns a device for heating with solar energy, which device contains at least one mirror construction which is mounted on a frame and which can be directed towards the sun, and at least three collectors at equal distance from each other, extending parallel to the mirror construction in order to collect the solar radiation reflected by the mirror construction, whereby the mirror construction contains a number of almost flat mirror strips extending next to one another in the longitudinal direction of the collectors and with their longitudinal direction northward/southward and which are each provided on the frame such that they can rotate around their longitudinal direction, whereas the collectors are stationary in relation to the frame, whereby the mirror strips are situated in an almost horizontal plane with their axes of rotation, whereby the device contains means to rotate the mirror strips and the mirroring surface of the mirror strips such that the solar rays coming in on said surface can be reflected towards the collectors and control means commanding the means to rotate in function of the position of the sun.

U.S. Pat. No. 3,861,379 discloses a device of the above mentioned type except that it contains only one collector All mirror strips are directed to this single collector and are pivoted together for tracking the sun.

When the sun is low, the angle between the incident solar rays and the rays reflected towards the collector will he larger than 90° for a number of the mirror strips, what reduces the efficiency.

Devices of the kind described in the first paragraph are disclosed amongst others in FR-A-1,520,370 and U.S. Pat. No. 4,229,229

These known devices contain two or more collectors and underneath each collector a series of mirror strips which may be rotated in function of the position of the sun.

The mirror strips of each series of mirror strips are always directed with their mirroring surface towards a same single collector which is then situated in the middle above the series of mirror strips.

In fact the last mentioned devices may be considered as consisting of two or more of the above mentioned known device as described in U.S. Pat. No. 3,861,379, places one after the other.

The angle between the incident solar rays and the rays reflected towards the collector will be larger than 90° for a number of the mirror strips, except when the sun is in its highest position above the mirror construction. The moment at which this angle becomes an acute angle coincides with different positions of the sun for these mirror strips and thus takes place at different points in time.

Mirror strips whose above-mentioned angle is larger than 90° make the efficiency of the device decrease.

The aim of the invention is to avoid this drawback.

To this aim, according to the invention, when three adjacent collectors are considered, the mirror strips thereunder are divided into two series, the mirror strips of one series reflecting to the collector situated in the middle while the mirror strips of the other series reflect to the one of the other two collectors situated above the series, the control means commanding the means to rotate in such way that, in the morning, a first series of mirror strips situated between the middle collector and the collector situated to the east thereof reflect towards this latter collector, whereas the second series of mirror strips situated between the middle collector and the collector situated to the west thereof reflect towards the middle collector and that, after the sun has massed its highest point during the day, i.e. in the afternoon, the first series of mirror strips reflect towards the middle collector and the second series of mirror strips reflect towards the collector situated to the west thereof.

In fact, the mirror construction can be regarded as two segmented, semi-parabolic mirrors which extend parallel to one another and whose segments have been flattened have been brought in a horizontal plane.

The first mirror construction can be further extended with one or several additional series of mirror strips and with an extra collector for every series.

The rotation device for rotating the mirror strips can be means to rotate at least a number of the mirror strips, for example all the mirror strips situated between two collectors or all the mirror strips together, simultaneously and to the same extent.

The device may include a wheel, for example a sprocket wheel or a toothed wheel on at least one end of each of the mirror strips, an endless element, for example a chain or toothed belt, working in conjunction with all these wheels, and drive means for driving this element.

The collector preferably contains at least one heat-absorbing pipe and at least one reflector, preferably consisting of two parabolic bent mirrors, directed towards the pine situated in between and which is erected above the pipe like a cap for collecting the solar rays reflected by the mirror construction and for reflecting them to the pipe.

This pipe preferably is a double-walled glass tube whose inner wall is coated with a heat-absorbing material on the outside and with a vacuum between both walls. Through this pipe may extend a metal tube, whereas the space between this metal tube and the pipe may be filled with a heat-transferring material such as steel wool.

In order to better explain the characteristics of the invention, the following two preferred embodiments of a device for heating with solar energy according to the invention are described as an example only without being limitative in any way, with reference to the accompanying drawings, in which.

Figure 4:
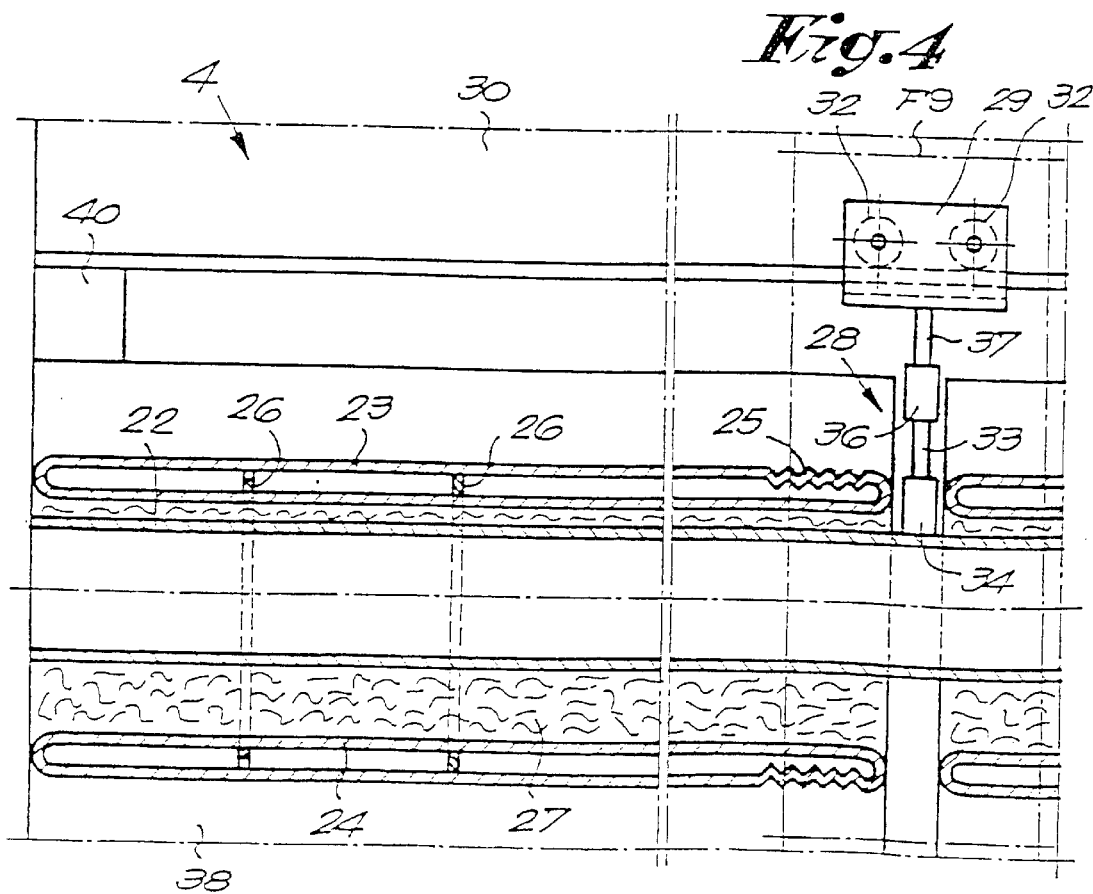
Figure 3:
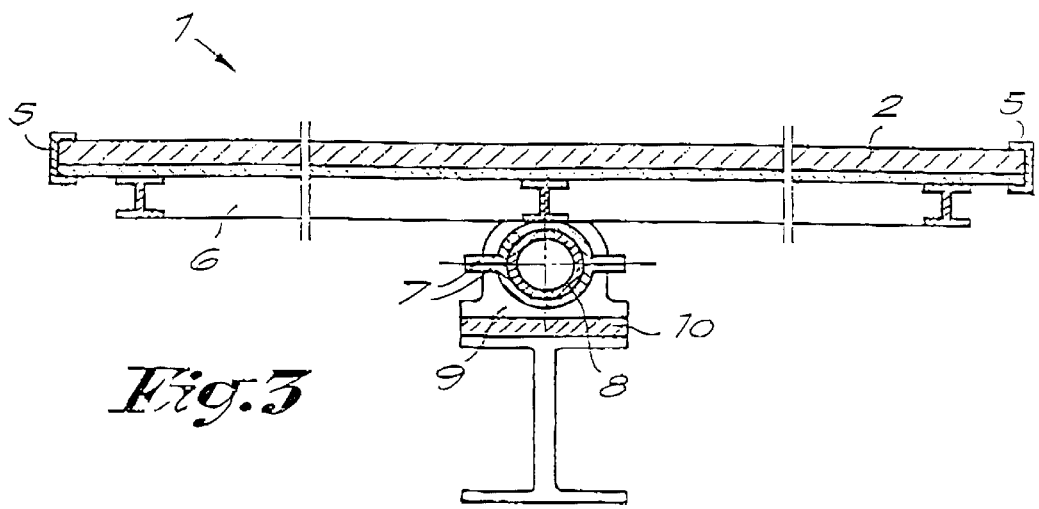
FIG. 3 shows a view in perspective with the collector of the device according to FIGS. 1 and 2 being partially cut out.
Figure 5:
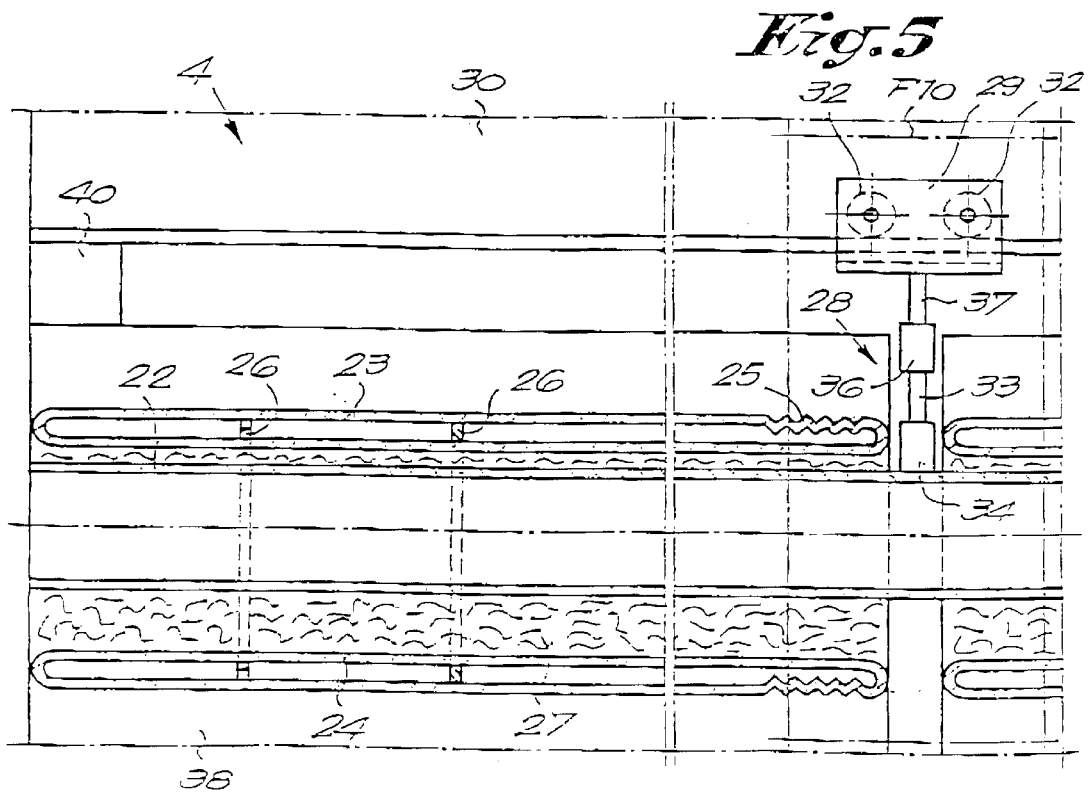
Figure 6:
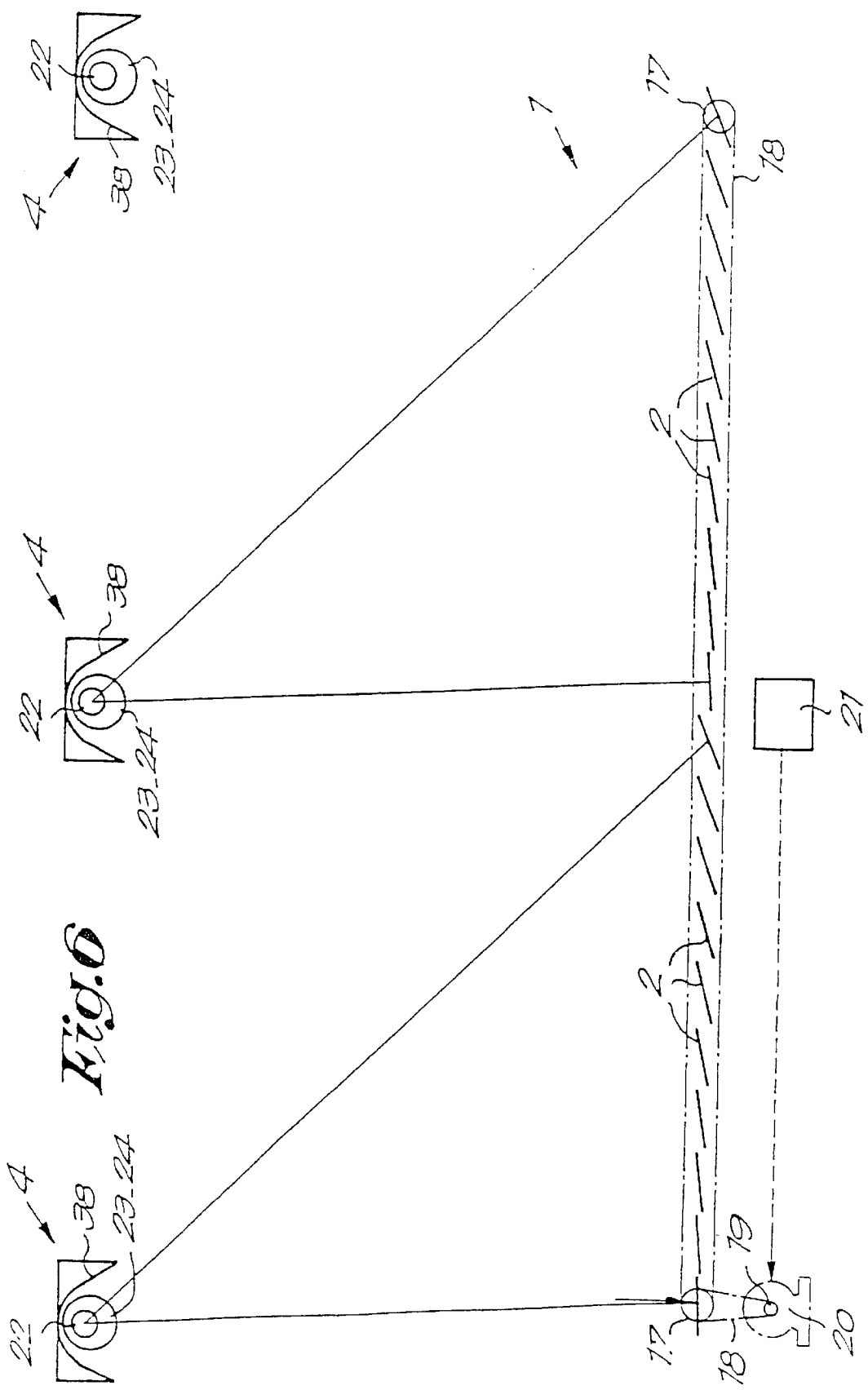
Figure 7:
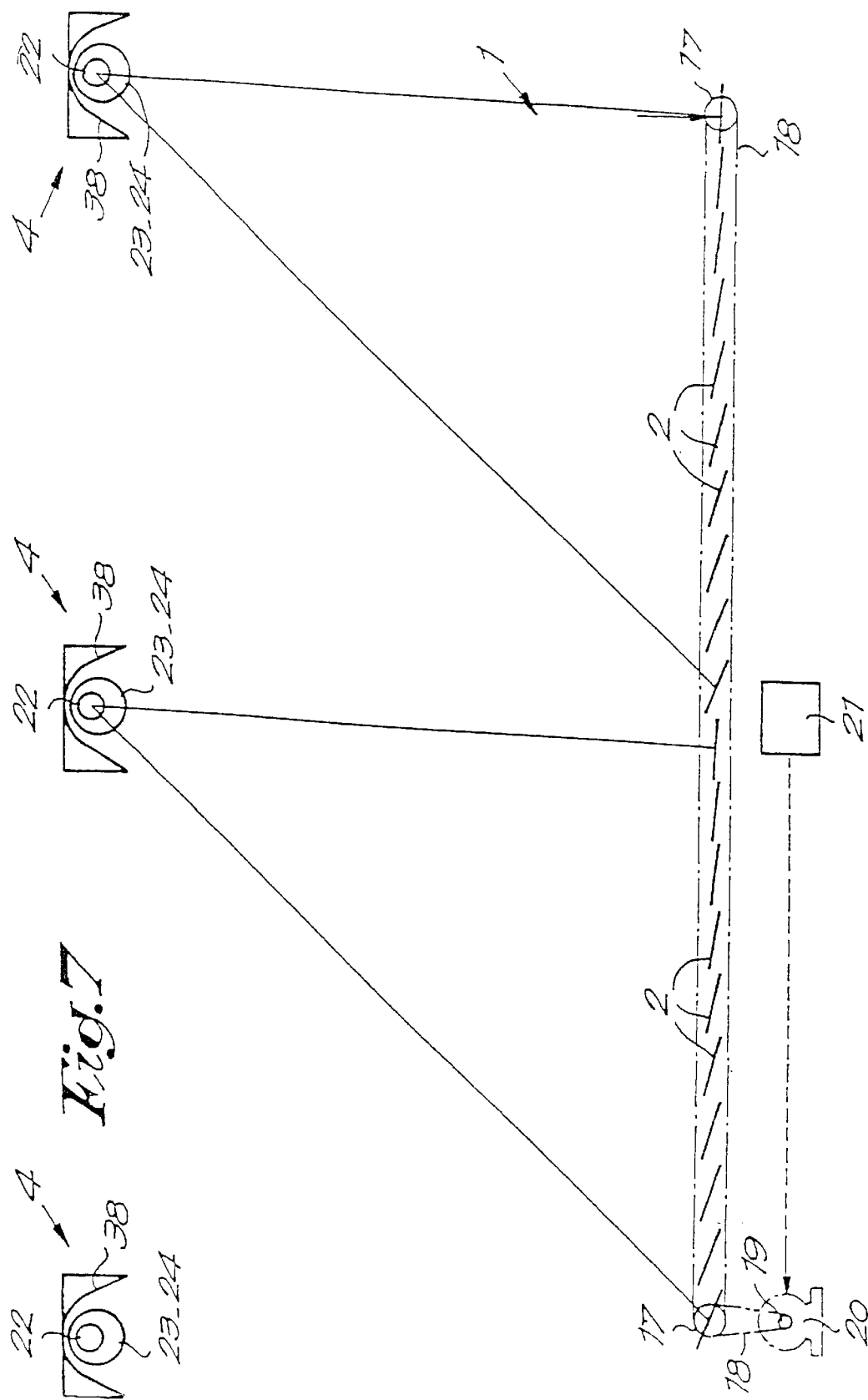
Figure 8:
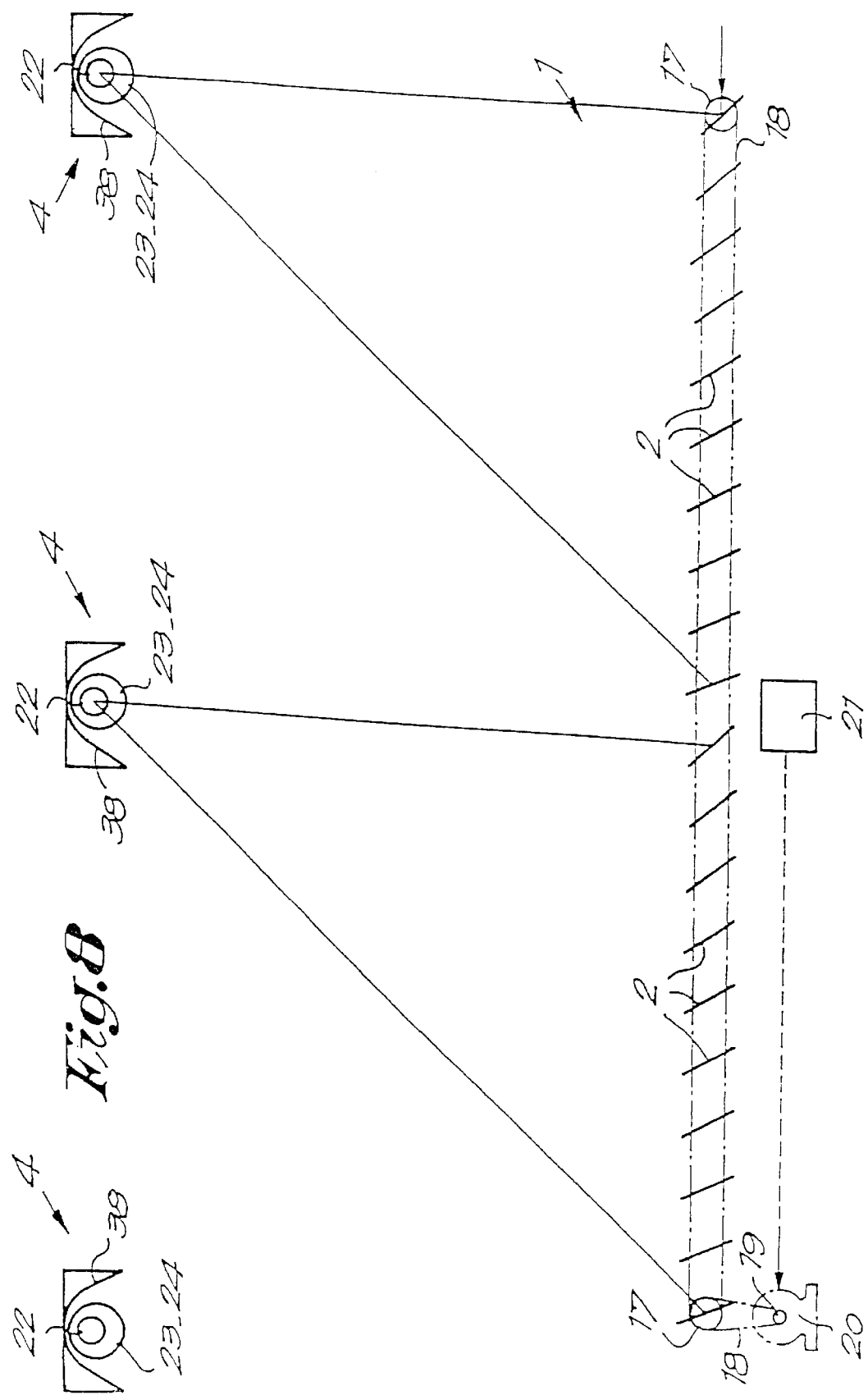
Figure 9:
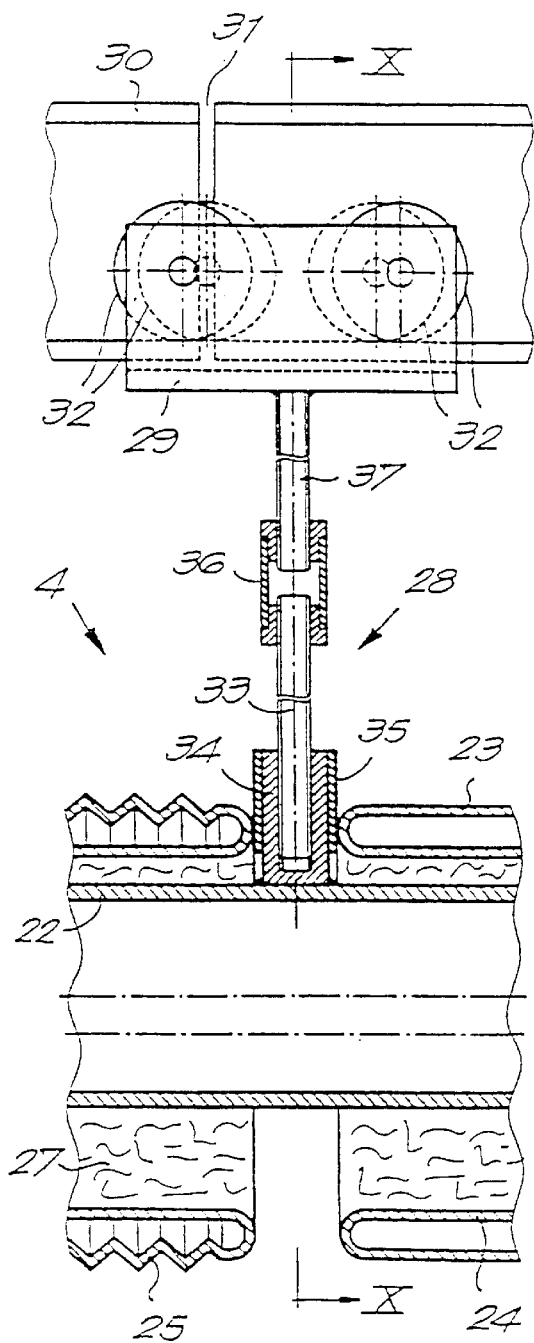
Figure 10:
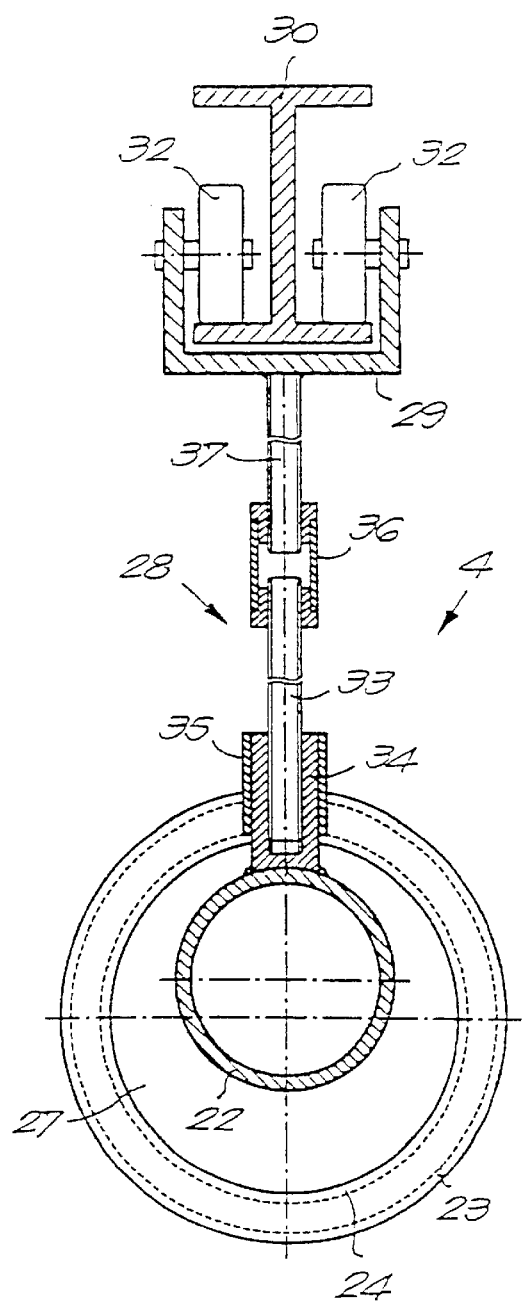

FIG. 4 schematically shows a longitudinal section of the collector from FIG. 3;

FIG. 5 schematically shows a front view of the device according to the invention;

FIGS. 6, 7 and 8 represent schematic front views analogous to those in FIG. 5, but with reference to two other situations of the device;

FIG. 9 shows the detail which is indicated by FIG. 9 in FIG. 4 to a larger scale;

FIG. 10 shows a section according to line X—X in FIG. 9.

Figure 1:
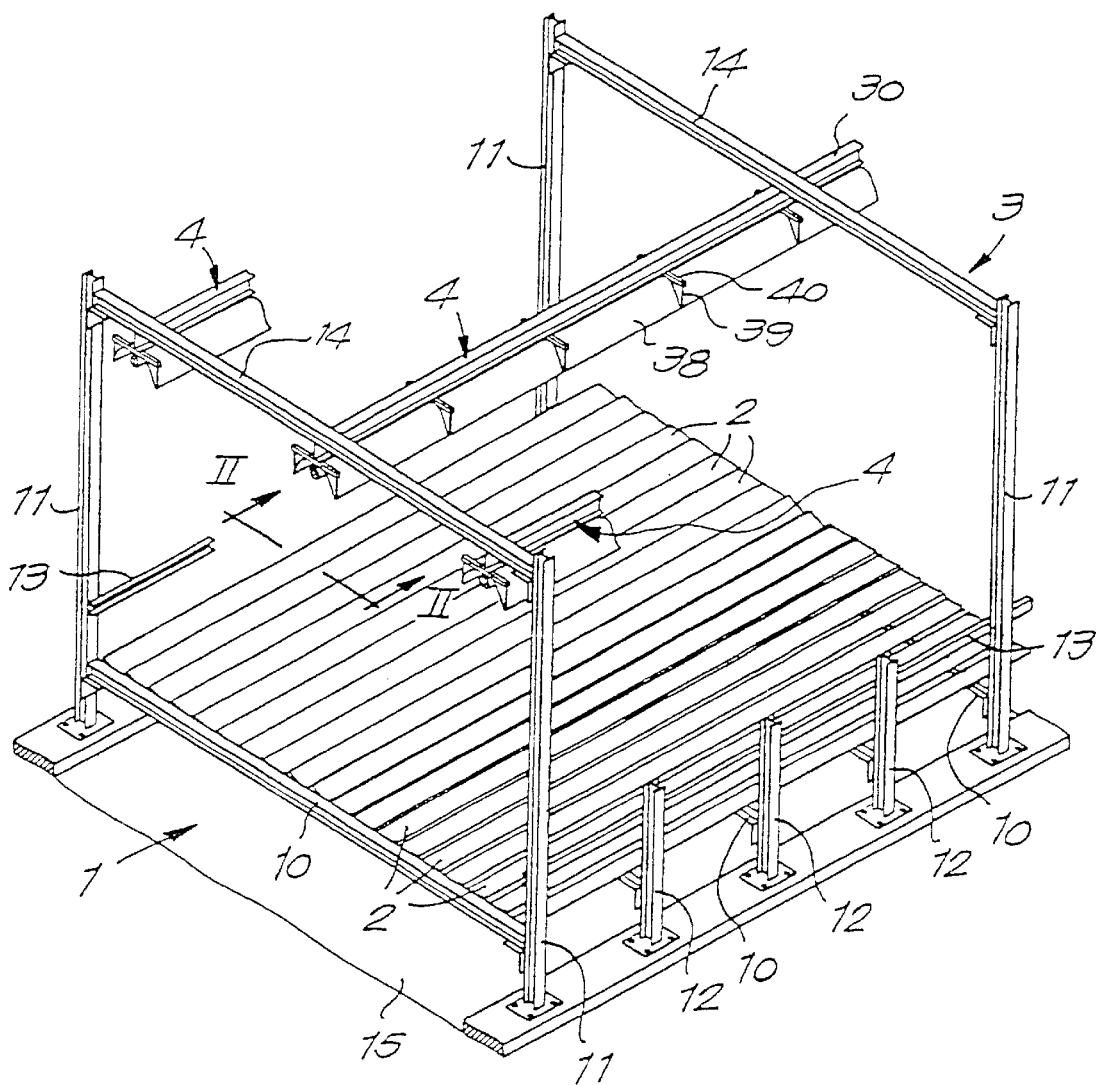
FIG. 1 shows a very schematic view in perspective of the device according to the invention.

As represented in FIG. 1 the device for heating with solar energy according to the invention mainly consists of a mirror construction 1 which is formed of a number of flat mirror strips 2 situated next to one another which are mounted on a frame 3 in a rotating manner according to their longitudinal direction or parallel to their longitudinal axis, and a collector 4 erected on top of it which is fixed stationary on the above-mentioned frame 3

The mirror strips 2 are flat and parallel to one another with their longitudinal direction.

They are for example made of glass with a mirroring coat on the top side and preferably a coat which can resist sandstorms on the bottom side, such as a coat on the basis of rubber or plastic.

They have a width of for example almost 50 cm, a length of about 3 m and a thickness of 3 mm.

Figure 2:
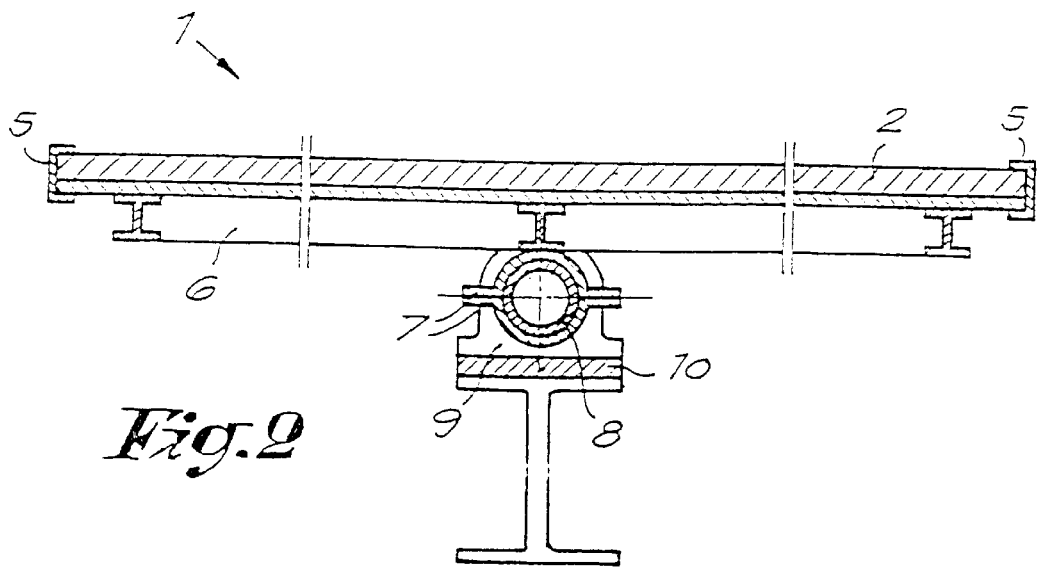
FIG. 2 shows a section according to line II—II in FIG. 1 to a larger scale.

Every mirror strip 2 can rotate. As is represented in detail in FIG. 2, every mirror strip 2 is hooked on a frame 6 made of aluminium profiles by means or clamps 5, which frame is in turn fixed on a tube 8 by means of clamping brackets 7, which tube is mounted in a bearing 9 every three metres which is fixed on a horizontal cross-latch 10 which is part of the frame 3.

All these cross-latches 10 are fixed with their ends to the rest of the frame 3, namely to standing profiles 11 or 12, at a height of about 1.5 m above the ground, but adjustable in height.

Between two profiles 12 in a longitudinal side are erected three shorter profiles 11, for 1 example one shorter profile 11 every three metres. The profiles 11 extend up to a distance above the mirror construction 1 and their top ends are connected to one another and to the profiles 12 by means of longitudinal profiles 13 in the longitudinal sides.

The standing profiles 12 are considerably higher than the profiles 11 and their top ends are connected to one another by means of horizontal cross-sectional profiles 14. The standing profiles 11 and 12 are fixed to a concrete foundation 15.

Over the two longitudinal profiles 13 may possibly ride a trolley which is not represented in the figures for maintaining, washing or repairing the mirror construction 1.

A rotation device 16 is provided to rotate the mirror strips 2 as a function of the position of the sun, during the day as the mirror strips are directed, with their longitudinal direction northward/southward.

The rotation device 16, which is only represented in FIGS. 5 to 8 for clarity's sake, includes a sprocket wheel 17 on one end of every tube 8 which is connected to a sprocket wheel 19 via a chain 18 which is driven by a drive consisting of a stepping motor 20.

The device 16 further includes an electronic control device 21 which controls this stepping motor 20 as a function of the position of the sun, such that the mirror strips 2 can follow the sun.

In principle, the length of the device in the longitudinal direction of the mirror strips 2 is unlimited, and this length may amount to one kilometre.

It is clear that the mirror strips 2 erected in the north/south direction must have different mutual inclinations for each position or the sun in their cross direction in order to reflect the collected solar rays to the only collector 4 which is hung in the middle above the mirror construction 1 on cross-sectional profiles 14.

According to the shown embodiment, the chain 18 extends around all the sprocket wheels 17 and the device 16 only includes a single stepping motor 20 which drives all the sprocket wheels 17 via a sprocket wheel 19 and the chain 18, and thus rotates all the mirror strips 2 simultaneously and to the same extent.

Each collector 4 is situated at a height above the mirror construction 1 which is for example half of the width of the mirror construction, for example at a height of twelve metres. However, the height can also be less and amount to for example six metres.

These collectors 4 extends in the longitudinal direction of the mirror strips 2.

As is represented in detail in FIGS. 3 and 6 this collector 4 contains a metal, preferably a steel tube 22 of for example 6 inches (about 15 cm) long which is surrounded by double-walled glass tubes 23–24. As opposed to steel tubes, glass tubes are not permeable to hydrogen, they are less expensive and they can have a smaller diameter.

The outer tube-shamed wall 23 of the tubes 23–24 is translucent, but the inner tube-shaped wall 24 is coated with a black, heat-absorbing layer on the outside which has for example been sputtered onto it.

On the ends, the walls 23 and 24 are closed, and there is a vacuum between these walls 23 and 24 which are for example situated at a distance of about 1 mm from one another.

This double-walled tube 23–24 is made of heat-resistant glass, for example glass which is known under the brand-name Pyrex. The inner, black wall 24 can be heated up to temperatures of 300 to 500° C. The outer wall 23, however, remains relatively cold.

The tube 23–24 is to 4 metres long, and in order to make it possible for the inner wall 24 to expand, expansion bellows 25 are provided at one end of the outer wall 23, preferably made of tempered class which has been fused to the rest of the class wall 23.

In order to prevent the inner wall 2 from buckling when it exerts some force on the expansion bellows 25 as a result of the expansion, glass rings 26 are clasped around said inner wall 24, for example by providing them over the wall 24 when they are hot and by making them shrink by cooling them, which make contact with the outer wall 3 only locally so as to limit the heat transfer.

The space between the inner wall 24 and the steel pipe 22, which has an atmospheric pressure, is filled with a medium 27 which transfers heat, for example steel wool surrounded by a thin aluminium sheet having a thickness of for example 0.3 mm, which is closely connected to the tube 22 and the wall 24.

Moreover, the double-walled tube 23–24 rests on the steel tube 22 through the agency of said medium 27.

The tube 22 extends over the entire length of the mirror strips 2, but it can also extent over several series of mirror strips 2 or mirror constructions 1 and even have a length of 1 kilometre.

The double-walled tube 23–24, however, only has a length of about 3 m, and several tubes 23–24 are provided one after the other around the steel tube 22 in the collector 4.

On he ends of the device and between two successive double-walled class tubes 23–24, the steel tube 22 is suspended to a trolley 29 by means of a suspension 28 rolling over a I-profile 30 of the frame 3, as is schematically represented in FIG. 4, and into more detail in FIGS. 9 and 10.

This I-profile 30, which extends over the entire length of the collector 4, but which is provided with an expansion joint 31 at regular distances, is suspended to horizontal cross-sectional profiles 14.

The trolley 29 is a U-profile whose two legs carry two small wheels 32 on their sides turned to one another. As is represented in FIG. 10, the front and rear wheels 32 are not placed on one and the same axis, but they are shifted in relation to one another in the driving direction, such that only one wheel 32 at a time rides over an expansion joint 31 while the trolley 29 is still resting with three wheels 32 on the I-profile 30. Thus, the trolley 29 is prevented from swinging as it rides over an expansion joint 31.

As is represented in detail in FIGS. 9 and 10, the suspension 28 may consist of a first bar 33 which is screwed in a bush 34 which is welded on the steel tube 22 and which is surrounded by insulating material 35 between the ends of two neighbouring tubes 23–24 on the one hand, and which is screwed in a sleeve 36 on the other hand, and of a second bar 37 which is welded onto the trolley 29 and which is also screwed in the above-mentioned sleeve 36, such that, as the sleeve 36 turns, the bars 33 and 37 are drawn towards one another or are moved away from one another. The screw thread is directed in one and the same direction on both ends of the bar 33, but the screw threads on both ends screwed in the sleeve 36 are directed in the opposite sense.

The collector 4 further contains a number of reflectors 38 which each consist of two longitudinal mirrors which are fixed to one another in the length above the glass tube 23–24 and which form a cap over the heat-absorbing pipe formed by the wall 24. The cross section of each mirror is a part, for example half, of a parabola.

The reflectors 38 are suspended on a cross-sectional profile 40 by means of bars 39 which is fixed to the bottom side of the I-profile 30.

Each reflector 38 is directed with its mirroring side on this wall 24 which is practically situated on the focal line of the two parabolic halves of this reflector 38.

The reflector 3, has a length which is almost equal to the length of a double-walled glass tube 23–24, and the collector 4 has several of those reflectors 38 which are situated in line above the mirror construction 1.

The opening at the bottom of the reflector 38 is calculated such that the solar rays which are reflected by all the mirror strips 2 of the mirror construction 1 fall in it and are thus reflected towards the inner wall 24 of the glass tube 23–24, insofar as they did not fall directly on this wall 24.

If the height of the collector 4 above the mirror construction 1 is about half of the width of the latter this opening is such that it can collect an angle of rays of 90°, and it is for example about 72 cm. When the collector 4 is positioned lower, the angle can be larger, for example up to 135°.

For practical reasons, the length of the mirror strips 2 is limited to for example 3 m, but several mirror constructions 1 can be put one after the other in the longitudinal direction, whereby the tubes 8 of a number of mirror strips 2 or even all the mirror strips 2 situated in line can form an uninterrupted whole, so that a single stepping motor 20 can simultaneously rotate a number of these mirror strips 2 which are coupled to one another, or all of them at once.

Also the frame 3 and among others the longitudinal profiles 13 and the I-profile 30, abstracting from the expansion joints 31, may continue uninterruptedly over several series of mirror constructions 1.

This also goes for the collector 4 suspended on the I-profile 30 which may have a length of up to one kilometre.

Moreover, several individual mirror constructions or mirror constructions situated one after the other in the longitudinal direction may also be situated next to one another in the cross direction.

By making use of flat mirror strips 2 instead of one or more parabolic mirrors, the construction is relatively simple. Its maintenance is relatively easy, especially thanks to a trolley riding over the longitudinal profiles 13.

In case of for example a sandstorm, the mirror strips can be rotated against the direction of the wind with their protected back side.

The device has a large efficiency. Only for a very short period in the early morning or late in the evening, the strip. During the rest of the day, little solar energy is lost due to shadows.

The mirror strips 2 are directed with their longitudinal direction in the north/south direction.

The three above-described collectors 4 are suspended to a I-profile 30, in that the mirror strips 2 have a different inclination in their cross direction and in that they are all driven by one.

One of the three collectors 4 is erected in the middle, as in the above-mentioned embodiment, whereas the other two are situated above the longitudinal edges, to the east and to the west respectively of this middle collector 4.

The mirror strips 2 are inclined such that they coincide with two longitudinal semi-parabolas which have been divided into segments and whereby the segments have been flattened and lowered in one and the same horizontal plane, and whereby the two semi-parabolas are practically parallel to one another.

The mirror strips 2 which coincide with the one semi-parabola reflect towards one collector 4, whereas those coinciding with the other semi-parabola reflect towards another collector 4, whereby, when the sun has reached its highest point, all the mirror strips 2 are rotated together over an angle, so that they each reflect towards another collector 4. This angle is 22.5° when the width of the mirror construction 1 is equal to twice the height at which the collectors 4 are situated, and the distance between the collectors 4 is thus equal to this height.

In FIG. 5 the mirror strips 2 are represented at the time the sun stands on the horizon in the east. The first series or half of the mirror strips 2 situated on the side of the sun reflect the collected solar rays towards the collector 4 situated eastward. The other series or half of the mirror strips 2 reflect towards the middle collector 4.

It is clear that in the farthest position represented in FIG. 5, the reflection is rather theoretical, since the mirror strips are situated in each other's shadow when the position of the sun is this low.

The mirror strips 2 are all continuously rotated by the means 16, but they keen reflecting towards the above-mentioned collectors 4 as the sun rises until they take the position in which they are represented in FIG. 6, when the sun is at its highest point. Before noon, they are rotated over 45° in total.

At noon, i.e. when the sun has reached its highest point, all mirror strips 2 are rotated, in the given example over 22.5°, into the position represented in FIG. 7.

The mirror strips 2 of the first series now reflect towards the middle collector 4 and the other mirror strips 2 towards the collector 4 situated westward.

In the course of the afternoon, all the mirror strips 2 are further simultaneously rotated by the means 16 over a total angle of 45° until the sun goes down in the west. The mirror strips 2 are then situated in the position represented in FIG. 8 and thus form the mirrored image of the situation before the rotation.

At any time, the angle between the incident solar rays and the solar rays reflected to a collector 4, which is represented for some mirror strips 2 in FIGS. 5 to 8, is smaller than 90°, so that the efficiency of the device is excellent.

As all the mirror strips 2 are always rotated together and to the same extent, the rotation device 16 has a simple construction and the tracking of the sun is rather easy.

It is clear that on both sides of the above-described mirror construction 1, additional mirror strips 2 can be provided as is represented by means of a dashed line in FIGS. 5 to 8, in particular one or several series of mirror strips 2 which coincide with a segmented semi-parabola, but for every series also one additional collector 4.

The additional series of mirror strips 2 situated eastward will reflect towards the collector 4 of the above-described mirror construction 1 situated the most eastward in the afternoon. In an analogous manner, an additional series situated westward will reflect towards the collector 4 of the above-described mirror construction 1 situated the most westward before noon.

As the mirror construction is divided in mirror strips 2, it is possible to put one or several mirror strips 2 entirely or partly off-duty, for example by tilting them separately so that they are no longer directed towards the sun, so as to thus adjust the total amount of solar energy which is collected by the device.

The present invention is by no means restricted to the embodiments described above and represented in the accompanying drawings; on the contrary, such a device for heating with solar energy can be made in all sorts of variants while still remaining within the scope of the invention.

What is claimed is:

1. A solar power heating device comprising:

a frame;

at least one mirror construction including a plurality of elongated, rectangular, flat mirror strips arranged in parallel rows, each of said mirror strips having a longitudinal centerline and an axis of rotation coextensive with said centerline and each of said mirror strips being individually rotatable about said axis of rotation, the axes of rotation of the mirror strips arranged substantially in a common plane;

at least three equally spaced light receiving collectors supported in an elevated relationship relative to and parallel with the mirror strips, with one of said collectors comprising a central collector and two of said collectors comprising end collectors;

a rotation device adapted to pivotally rotate each of said mirror strips about its respective axis of rotation;

a control device arranged to control said rotation device so as to maintain light reflected from said plurality of mirror strips incident on at least two of said collectors;

said plurality of mirror strips being divided into at least two mirror strip groups wherein each mirror strip group is bounded by said central collector and by one of said end collectors, said control device alternatively orienting said mirror groups between at least two positions wherein in a first position one of said mirror groups reflects light to said central collector and another of said mirror groups reflects light to one of said end collectors, and in a second position, said another of said mirror groups reflects light to said central collector and said one of said mirror groups reflects light to another of said end collectors.

2. The device according to claim 1 wherein the mirror construction comprises two segmented, semi-parabolic mirrors extending parallel to one another and having flattened segments arranged in a horizontal plane.

3. The device according to claim 1 wherein the mirror construction further includes at least one additional series of mirror strips corresponding to an additional collector.

4. The device according to claim 1 wherein the rotation device rotates at least a portion of said mirror strips simultaneously.

5. The device according to claim 1 wherein the rotation device rotates all of said mirror strips of one of said two groups simultaneously.

6. The device according to claim 4 wherein the rotation device includes wheels connected to each of said mirror strips, an endless element adapted to cooperate with said wheels, and a drive device arranged to drive said element.

7. The device according to claim 1 wherein each collector comprises at least one heat-absorbing tube and at least one reflector directed towards and positioned above said tube, said at least one reflector arranged to direct light a concentration of light reflected from said mirror strips onto said tube.

8. The device according to claim 7 wherein the reflector comprises two parabolic bent mirrors.

9. The device according to claim 7 wherein the tube comprises a double-walled glass tube having an inner tube-shaped wall coated with a heat-absorbing material on the exterior, said outer tube-shaped wall being translucent, and further including a vacuum between said walls.

10. The device according to claim 9 comprising a metal tube extending through said double-walled glass tube, wherein a space between this metal tube and the glass tube is filled with a heat-transferring medium.

11. The device according to claim 9 comprising a double-walled glass tube having an inner wall and an outer wall, said inner wall having expansion bellows provided therein.

12. The device according to claim 11 further comprising rings disposed between the inner and outer walls of the glass tube, said rings contacting said outer wall locally.

13. The device according to claim 10 further comprising a plurality of glass tubes located above the mirror construction and provided one after the other around a single metal tube, said glass tubes being supported by said metal tube.

14. The device according to claim 1 wherein said collectors include a metal tube for heating a fluid, said collectors further being suspended at equal distances along a longitudinal profile of said frame by a trolley adapted to be positioned at different points along said longitudinal profile.

15. The device according to claim 14 wherein the longitudinal profile includes expansion points, said trolley having two front and two back wheels positioned along different axes and shifted in relation to one another in the driving direction.

16. The device according to claim 14 wherein the metal tube is suspended by a suspension device including two bars joined together in a sleeve so as to be adjustable in relation to one another by turning said sleeve.

* * * * *